Feb. 6, 1940. H. H. TOLEN 2,189,047
WIENER ROASTER
Filed Jan. 30, 1939
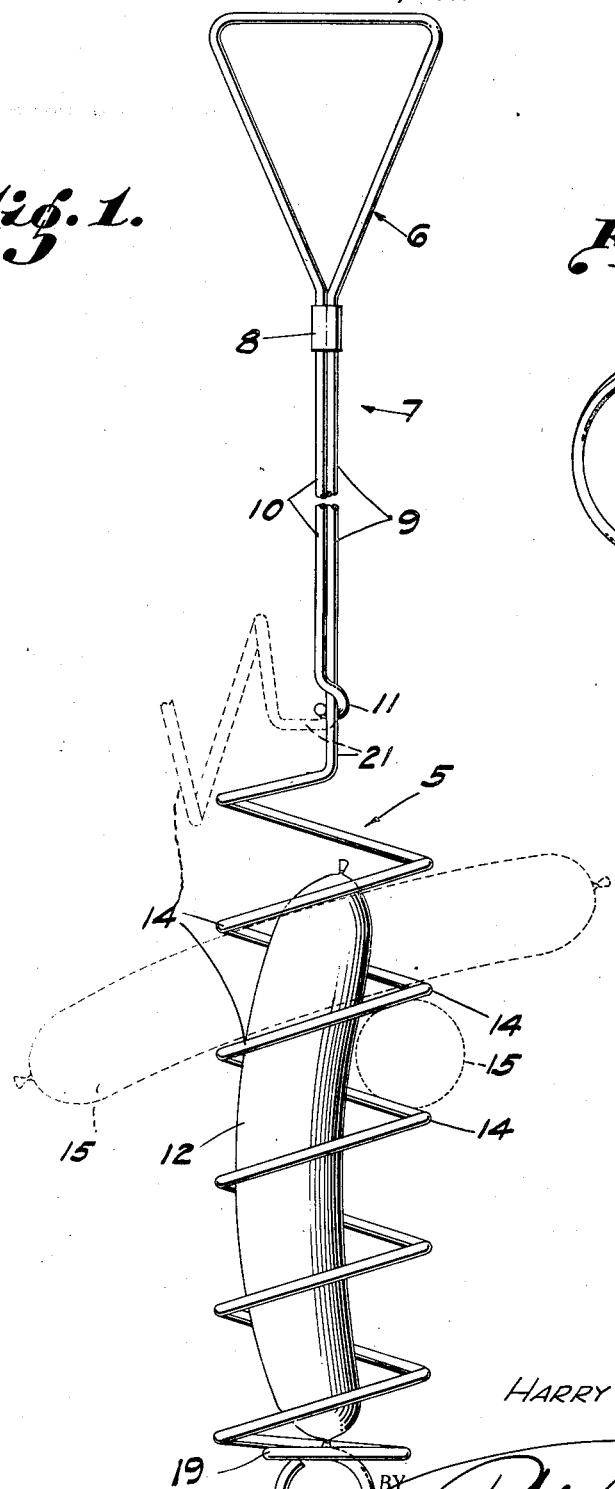
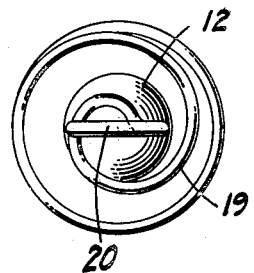
Harry H. Tolen,
INVENTOR.
BY
ATTORNEY.

Patented Feb. 6, 1940

2,189,047

UNITED STATES PATENT OFFICE 2,189,047

WIENER ROASTER

Harry H. Tolen, Chula Vista, Calif.

Application January 30, 1939, Serial No. 253,564

1 Claim. (Cl. 53—5)

This invention relates to a device for supporting one or more articles in a position for being roasted and pertains more particularly to a device for supporting a wiener or other small sausage in a position for roasting.

Devices hitherto in use for the purpose above stated have usually been made up of a greater number of parts than it is essential that they should possess, which has added considerably to their cost without materially increasing their utility. It is one of the principal objects of this invention to produce an extremely simple and very inexpensive article for the intended purpose, but which will, nevertheless, be operable in an entirely satisfactory manner.

A more specific object of the invention is to provide a wire device for supporting wieners while being roasted, the wire being resilient and being shaped in such a manner that adjacent parts thereof after having been sprung apart to receive the wieners between them will grip them in such a way as safely to support them in the desired position for roasting.

Hence by this device wieners may be supported safely over a fire in a holder that does not puncture their skins. Also the juice does not come out, nor is there danger of the wieners breaking or falling. It is an excellent device to use for roasting the skinless type of wieners.

Other objects, advantages, and features of invention will hereinafter appear.

Referring to the accompanying drawing, which illustrates what is at present deemed to be a preferred embodiment of the invention, Fig. 1 is a perspective view of the device, one wiener being shown in full lines supported thereby, and dotted lines indicating the positions of other wieners as they would appear if at the same time supported thereby. In this figure part of the shank of the handle portion is broken out to contract the view. Also there is a dotted line indication showing how the shank may be bent to dispose the handle portion angularly to the part which carries the wieners.

Fig. 2 is a bottom plan view of the device shown in Fig. 1.

Referring in detail to the drawing, the device is therein shown as consisting solely of a wire having a coil portion 5, a handle portion 6, shank portion 7 and a clip 8 which aids in securing together in an overlapping contacting relation, the straight wire runs 9 and 10 which make up said shank portion. Said shank portion 7 is made of ample length for use in supporting the wieners over hot campfires and at a considerable distance from the user.

The device is made out of a resilient wire preferably of No. 10 gauge, and is desirably bent at one end into a triangularly shaped handle, as shown. The sheet metal clip 8 is shown applied to the wire runs 9 and 10 of the shank 7 near the handle 6, the end of the wire run 10 being curled at 11 to secure it to said wire run 9.

The coil portion 5 is made of a sufficient diameter to receive an average sized wiener 12 longitudinally therewithin, such wiener being inserted in an endwise manner into the end of the coil nearest the handle, there being considerable clearance along the sides of said wiener, allowing it to be crowded to one side sufficiently to admit between adjacent coils 14 additional wieners 15 to be roasted at the same time. Two such additional wieners 15 are dottedly indicated in the drawing, but still more may be likewise supported, if desired. In mounting these additional wieners adjacent coils may be sprung farther apart by wedging the wieners between them in the lateral manner indicated, and then the resiliency of the wire will cause such wieners to be gripped thereby with a sufficient force safely to support them while being roasted. Or instead, longitudinal traction may be applied to the device to separate farther adjacent coils thereof preparatory to inserting one or more wieners between them, as will hereinafter be more fully described.

The end of the coil farthest from the handle is furnished with a flattened helix portion 19 having a central, downwardly extending, eyeletted, terminal handle portion 20. The wire in said portion 19 forms a stop means which effectually safeguards against the wiener 12 dropping out of the appliance when held in a vertical position with its coil portion directed downwardly. The eyeletted portion 20 is utilizable, in conjunction with the handle 6, to lengthen the device by tractive force, thereby to expand the coils thereof preparatory to inserting the wieners 15 between them.

The portion of the shank which is adjacent to the coil 5 consists of a single wire run 21. This run 21 is related to the coiled part circumferentially rather than axially so that there will be ample space for inserting and removing the wiener 12. The user may, therefore, bend this part of the shank to any angle desired (for example, ninety degrees as indicated by dotted lines in Fig. 1) so that, under certain conditions, the coil portion may be more conveniently supported in the desired relation to a camp fire or other source of heat.

While the invention, as claimed, is not limited to the specific size or shape of the coil shown, it is nevertheless desirable that its spirals be about one and one-half inches in diameter and that they be spaced about ¾ of an inch apart.

In using the device it may, in some cases, be found desirable to suspend one or more such devices over a large campfire or other source of heat, in which case, or at other times desired, a horizontal rod may be projected through the triangular handle 6 as a suspending means.

While resting the lower end of the device upon a support downward pressure may be applied by means of the handle 6 thus contracting the length of the spiral part and causing the upper portion of a wiener contained wholly within the spirals to be projected out of the upper end of the spiral part to such an extent that the wiener may be easily withdrawn from the coil without contact with the coil burning the user's hand.

Also, as to the wieners 15, held between adjacent coils, a number of these may be discharged en masse by applying longitudinal traction to the device by means of its handle portions.

It should be understood that the present disclosure is for the purpose of illustration only and that this invention includes all modifications and equivalents which fall within the scope of the subject matter claimed.

What is claimed is:

A device of the kind described consisting of a single wire having a spiral wiener supporting portion and a handle portion extending from one end of said spiral portion, the terminal part of said handle portion consisting of a loop of said wire, and the proximal part thereof consisting partly of a double wire run and partly of a single and bendable run of wire.

HARRY H. TOLEN.